July 16, 1963 M. O. DE VOS 3,097,885
SEAT CONSTRUCTION
Filed Dec. 27, 1961
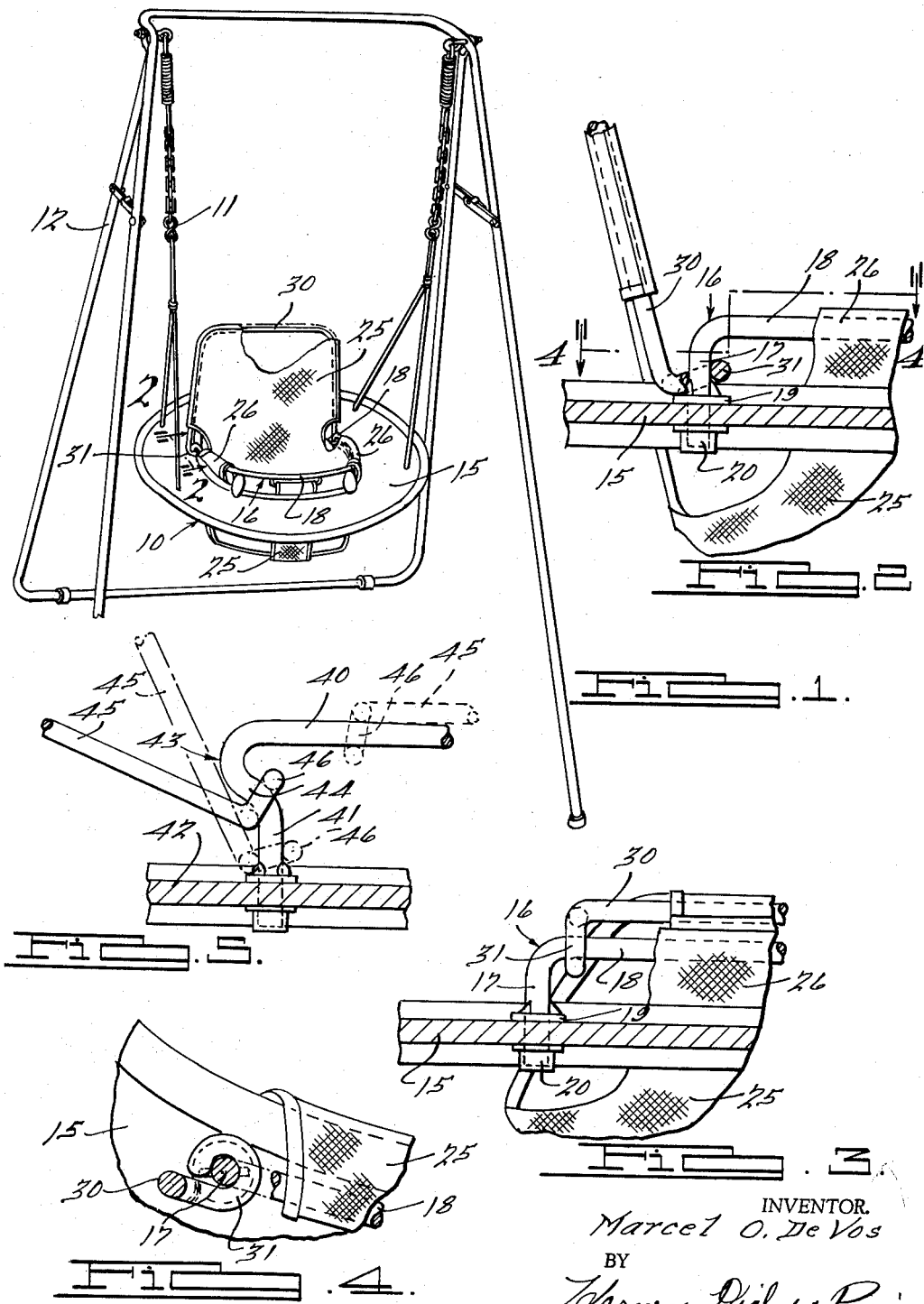
INVENTOR.
Marcel O. De Vos
BY
Harness, Dickey & Pierce
ATTORNEYS United States Patent Office 3,097,885
Patented July 16, 1963

3,097,885
SEAT CONSTRUCTION
Marcel O. De Vos, Grosse Pointe Woods, Mich., assignor, by mesne assignments, to Grow-Rite Corporation, a corporation of New York
Filed Dec. 27, 1961, Ser. No. 162,468
6 Claims. (Cl. 297—378)

This invention relates to a seat construction and more particularly to a novel hinge construction for pivotally mounting a seat back whereby it may be supported in a raised, operative position or moved to an inoperative, folded position.

One of the objects of this invention is to provide a hinge construction of this type which comprises a minimum number of parts but which embodies means for effectively supporting and retaining the seat back in its raised, operative position and which also readily permits the seat back to be moved to its folded, inoperative position.

Another object of this invention is to provide a modified hinge construction of this type wherein the seat back may also be moved to a reclining position.

Another object of the invention is to provide a seat back support of this type which is of simple construction comprising but two parts which may be quickly and economically manufactured and which may be assembled with facility.

Various other objects and advantages, and the novel details of construction of one commercially practical embodiment of the invention will become more apparent as this description proceeds, especially when considered in connection with the accompanying drawings in which:

FIGURE 1 is a perspective view of a child's swing having a seat embodying this invention, FIGURE 2 is an enlarged, fragmentary sectional, elevational view, taken substantially on line 2—2 of FIGURE 1, showing the hinge construction of this invention, the seat back being shown in its raised or operative position, FIGURE 3 is a view similar to FIGURE 2 with the seat back in its folded or inoperative position, FIGURE 4 is a detail sectional, elevational view taken substantially on line 4—4 of FIGURE 2, and FIGURE 5 is a view similar to FIGURE 2 showing a modification in which the seat back can be moved to a reclining position.

While it will be obvious, as this description proceeds, that the seat construction of this invention may be employed in various environments, it is herein shown as being used in connection with a swing 10 mounted by suspension means 11 to a stand 12.

In the embodiment illustrated, the reference character 15 indicates the body portion of the swing which constitutes a supporting member to which one element of the improved hinge construction is secured. This element of the hinge construction, in the embodiment illustrated, comprises a substantially U-shape member 16 having angularly-extending legs 17 at the ends thereof secured to the supporting member 15 and having its intermediate portion 18 spaced from and parallel with said support 15. Each leg 17 extends through the support 15, substantially perpendicularly thereto, and is secured in place by a washer or other abutment 19 secured to the leg 17 and engaging the top of the support and a cap nut or the like 20 on the end of the leg 17 engaging the under side of the support 15.

In the swing illustrated in the drawing, the U-shape member 16 constitutes the seat frame which acts as a partial support for the flexible seat cover 25. Thus, the intermediate portion 18 of the U-shape member 16 is curved as illustrated in FIGURE 1 and has the flexible seat cover looped thereover as indicated at 26, the seat cover being secured in place by snap fasteners or the like, not shown.

The back of the seat is formed by a U-shape back frame 30 over which the back portion of the seat cover 25 is placed.

The ends of the U-shape back frame 30 are bent to form substantially circular loops 31, the inside diameter of the loops being slightly larger than the outside diameter of the legs 17 of the U-shape member 16. These loops 31 extend substantially perpendicularly to the plane of the back frame 30. These loops encircle the member 16 for sliding movement thereon so that the back frame member 30 may be moved from its operative position illustrated in FIGURE 2 to its folded position illustrated in FIGURE 30.

When the back frame 30 is moved to its raised or operative position, the loops 31 rest at the base of the U-shape member 16 and the loops assume a canted or inclined or tilted position with respect to the legs 17 so as to lock and hold the seat frame 30 in its raised position. To move the back frame 30 to its folded position, the frame 30 is moved slightly forwardly and then upwardly and then forwardly to slide the loops 31 along the legs 17 and onto the spaced horizontal portions 18 of the U-shape member 16 to the position illustrated in FIGURE 3, in which position the back frame 30 pivots on its loops 31 to its folded position.

In FIGURE 5, a slightly modified form of hinge construction is illustrated. In this form of construction, the legs of the U-shape member 40 are each provided with a straight portion 41 which extends substantially perpendicularly from the support 42 and with a laterally-extending curved portion 43 providing an angularly-extending portion 44. The back frame 45 is provided with looped ends 46 similar to the loops 31. When these loops engage the angularly-extending portion 44, as shown in full lines in FIGURE 5, the back frame 45 of the seat is in a reclining position. When the loops 46 are engaged with the perpendicular portions 41 of the legs, the seat back frame will be in its normal raised position, as shown by dot and dash lines. The folded position of the back frame is shown in dotted lines.

As will be apparent from the foregoing description, there is provided a hinge for seat backs which is of extremely simple construction, comprising substantially two parts, which may be quickly and economically manufactured and which may be assembled with facility. While the seat construction of this invention may, as heretofore stated, be used in many different environments, it finds particular utility in juvenile furniture and vehicles, where simplicity and economy are more important than maximum strength.

While two practical and commercially acceptable forms of the invention have been described and illustrated herein in detail, it will be understood that various changes may be made as may come within the purview of the accompanying claims.

What is claimed is:

1. A seat construction comprising, a support member, a member having angularly extending legs secured to said support member to extend substantially perpendicular thereto and having an intermediate portion spaced therefrom, a substantially U-shaped back frame, and loops carried by the legs of the U-shaped back frame encircling said member for slidable movement thereon, said loops engaging the angularly extending legs of said member in canted relation thereto to hold the back frame in its raised position.

2. A seat construction comprising, a support member, a member having angularly extending legs secured to said support member to extend substantially perpendicular thereto and having an intermediate portion spaced therefrom, a substantially U-shaped back frame, and loops carried by the legs of the U-shaped back frame encircling said member for slidable movement thereon, said loops being engaged with said intermediate portion of said member to permit the back frame to be moved to folded position.

3. A construction as described in claim 1 in which said loops are formed on the ends of the legs of the U-shaped back frame and extend at an angle to the plane of the back frame.

4. A construction as described in claim 1 in which said loops are formed on the ends of the legs of the U-shaped back frame and extend substantially perpendicularly to the plane of the back frame.

5. A construction as described in claim 1 in which said loops are formed by bending the ends of the legs of the U-shaped back frame into circular shape having an inside diameter larger than the cross-sectional diameter of said member with which they slidably engage.

6. A construction as described in claim 1 in which the legs of said member are each provided with a laterally angularly-extending portion engageable by said loops to permit the back frame to be moved to a reclining position.

References Cited in the file of this patent

UNITED STATES PATENTS

| | | |
|---|---|---|
| 1,187,875 | Welty | June 20, 1916 |
| 2,627,894 | Herider | Feb. 10, 1953 |

FOREIGN PATENTS

| | | |
|---|---|---|
| 254,754 | Switzerland | May 31, 1948 |